(12) United States Patent
Takano et al.

(10) Patent No.: US 11,472,907 B2
(45) Date of Patent: Oct. 18, 2022

(54) POLYMERIZATION CATALYST COMPOSITION, POLYMER MANUFACTURING METHOD, POLYMER, RUBBER COMPOSITION, AND TIRE

(71) Applicant: BRIDGESTONE CORPORATION, Tokyo (JP)

(72) Inventors: Shigenaga Takano, Kodaira (JP); Shojiro Kaita, Tokyo (JP); Kohtaro Osakada, Yokohama (JP); Daisuke Takeuchi, Aomori (JP); Shinji Yamakawa, Kanagawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 228 days.

(21) Appl. No.: 16/643,878

(22) PCT Filed: Aug. 28, 2018

(86) PCT No.: PCT/JP2018/031831
§ 371 (c)(1),
(2) Date: Mar. 3, 2020

(87) PCT Pub. No.: WO2019/044855
PCT Pub. Date: Mar. 7, 2019

(65) Prior Publication Data
US 2020/0347169 A1    Nov. 5, 2020

(30) Foreign Application Priority Data
Sep. 4, 2017  (JP) ............................. JP2017-169573

(51) Int. Cl.
| | | |
|---|---|---|
| C08F 236/06 | (2006.01) | |
| B60C 1/00 | (2006.01) | |
| C07F 15/04 | (2006.01) | |
| C07F 15/06 | (2006.01) | |
| C08F 210/02 | (2006.01) | |

(52) U.S. Cl.
CPC ............. *C08F 236/06* (2013.01); *B60C 1/00* (2013.01); *C07F 15/045* (2013.01); *C07F 15/065* (2013.01); *C08F 210/02* (2013.01)

(58) Field of Classification Search
USPC ......................................... 526/171; 502/167
See application file for complete search history.

(56) References Cited

U.S. PATENT DOCUMENTS

| | | | |
|---|---|---|---|
| 4,579,920 A * | 4/1986 | Tsujimoto | ............ C08F 136/06 525/243 |
| 8,324,329 B2 | 12/2012 | Luo et al. | |
| 8,962,743 B2 | 2/2015 | Kaita et al. | |
| 9,266,978 B2 | 2/2016 | Kaita et al. | |
| 10,131,722 B2 | 11/2018 | Hirata et al. | |
| 10,239,964 B2 | 3/2019 | Yamagata et al. | |
| 2005/0239639 A1 | 10/2005 | Monteil et al. | |

FOREIGN PATENT DOCUMENTS

| | | |
|---|---|---|
| CN | 103154045 A | 6/2013 |
| CN | 103154058 A | 6/2013 |
| CN | 103254331 A | 8/2013 |
| CN | 103254358 A | 8/2013 |

(Continued)

OTHER PUBLICATIONS

Machine-generated translation of Detailed Description of JP 2007-055915A; retrieved from ESPACENET on Dec. 13, 2021. (Year: 2007).*

(Continued)

*Primary Examiner* — Fred M Teskin
(74) *Attorney, Agent, or Firm* — Sughrue Mion, PLLC

(57) ABSTRACT

To provide a catalyst composition having high polymerization activity. To provide a polymer manufacturing method. To provide a polymer manufactured by the polymer manufacturing method. To provide a rubber composition including the polymer. To provide a tire using the rubber composition. A catalyst composition including a compound represented by Structural Formula I below, wherein the compound has an OH group at at least one position of the bipyridyl ring; M is a transition metal, a lanthanoid, scandium, or yttrium; $R^1$ and $R^2$ are a hydrocarbon group having one or more carbon atoms or a halogen atom; and $R^1$ and $R^2$ may be the same or different from each other. A polymer manufacturing method including a step of polymerizing one or more selected from the group consisting of a conjugated diene compound and a compound having an ethylenically unsaturated double bond in the presence of the catalyst composition. A polymer manufactured by the manufacturing method. A rubber composition including the polymer. A tire using the rubber composition.

[Formula 1]

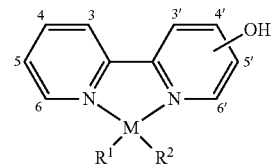

Formula 1

10 Claims, No Drawings

(56) References Cited

FOREIGN PATENT DOCUMENTS

| | | |
|---|---|---|
| CN | 106604935 A | 4/2017 |
| CN | 106661140 A | 5/2017 |
| EP | 1170313 B1 | 6/2010 |
| JP | 07-062152 A | 3/1995 |
| JP | 10-237131 A | 9/1998 |
| JP | 2006-503141 A | 1/2006 |
| JP | 2007-055915 A | 3/2007 |
| JP | 2011-246620 A | 12/2011 |
| JP | 2014-019729 A | 2/2014 |
| WO | 2018/035506 A1 | 2/2018 |

OTHER PUBLICATIONS

Toma-Mendivil, et al, "Conjugate addition of arylboronic aicds to alpha,beta-unsaturated carbonyl compounds in aqueous medium using Pd(II) complexes with dihydroxy-2,2'-bipyridine ligands . . . ," Catalysis Science & Technology, 2011, 1, 1605-1615. (Year: 2011).*

Extended European Search Report dated Sep. 30, 2021 in Application No. 18851849.2.

Eder Tomas-Mendivil et al., "Palladium(II) complexes with symmetrical dihydroxy-2,2'-bipyridine ligands: Exploring their inter- and intramolecular interactions in solid-state", Polyhedron, 2013, vol. 59, pp. 69-75 (7 pages total).

Sopheavy Siek et al., "Iridium and Ruthenium Complexes of N-Heterocyclic Carbene- and Pyridinol-Derived Chelates as Catalysts for Aqueous Carbon Dioxide Hydrogenation and Formic Acid Dehydrogenation: The Role of the Alkali Metal", Organometallics, 2017, pp. 1091-1106, vol. 36.

International Search Report for PCT/JP2018/031831 dated Dec. 4, 2018 [PCT/ISA/210].

International Preliminary Report on Patentability with translation of Written Opinion dated Mar. 10, 2020, in International Application No. PCT/JP2018/031831.

Dingyi Hong, "Handbook of Plastics Industry", Chemical Industry Press, pp. 32-34, Mar. 1999 (7 pages total).

Search Report of Office Action dated Dec. 3, 2021 from the China National Intellectual Property Administration in CN Application No. 201880057257.7.

* cited by examiner

POLYMERIZATION CATALYST COMPOSITION, POLYMER MANUFACTURING METHOD, POLYMER, RUBBER COMPOSITION, AND TIRE

CROSS REFERENCE TO RELATED APPLICATIONS

This application is a National Stage of International Application No. PCT/JP2018/031831 filed Aug. 28, 2018, claiming priority based on Japanese Patent Application No. 2017-169573 filed Sep. 4, 2017.

TECHNICAL FIELD

The present disclosure relates to a polymerization catalyst composition, a polymer manufacturing method, a polymer, a rubber composition, and a tire.

BACKGROUND

Coordinated anionic polymerization which uses a catalyst system represented by a Ziegler-Natta catalyst is well known to allow homopolymerization of an olefin or a diene. However, in such a catalyst system, it has been difficult to efficiently copolymerize an olefin and a diene. For example, while PTL 1 describes copolymerization of ethylene and butadiene, the method described in PTL 1 has had such a problem that a polymer obtained has a limited structure, catalytic activity is low, or the molecular weight of a polymer produced is small.

CITATION LIST

Patent Literature

PTL 1: National Publication of International Patent Application No. 2006-503141

SUMMARY

Technical Problem

In view of the above, an object of the present disclosure is to provide a catalyst composition having high polymerization activity for polymerizing one or more selected from the group consisting of a conjugated diene compound and a compound having an ethylenically unsaturated double bond, for example. In addition, an object of the present disclosure is to provide a polymer manufacturing method capable of polymerizing one or more selected from the group consisting of a conjugated diene compound and a compound having an ethylenically unsaturated double bond. In addition, an object of the present disclosure is to provide a polymer manufactured by the polymer manufacturing method. In addition, an object of the present disclosure is to provide a rubber composition including the polymer. Further, an object of the present disclosure is to provide a tire using the rubber composition.

Solution to Problem

A catalyst composition according to the present disclosure is a catalyst composition including a compound represented by Structural Formula I below, wherein the compound has an OH group at at least one of positions 3 to 6 and positions 3' to 6' of the bipyridyl ring; M is a transition metal, a lanthanoid, scandium, or yttrium; $R^1$ and $R^2$ each are a hydrocarbon group having one or more carbon atoms or a halogen atom; and $R^1$ and $R^2$ may be the same or different from each other.

[Formula 1]

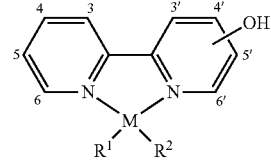

Formula 1

The catalyst composition according to the present disclosure has high polymerization activity on manufacturing one or more selected from a polymer of a conjugated diene compound, a polymer of a compound having an ethylenically unsaturated double bond, and a copolymer of a conjugated diene compound and a compound having an ethylenically unsaturated double bond.

A polymer manufacturing method according to the present disclosure is a polymer manufacturing method using any catalyst composition described above, the polymer manufacturing method including a step of polymerizing one or more selected from the group consisting of a conjugated diene compound and a compound having an ethylenically unsaturated double bond in the presence of the catalyst composition.

The polymer manufacturing method according to the present disclosure is capable of polymerizing one or more selected from the group consisting of a conjugated diene compound and a compound having an ethylenically unsaturated double bond.

A polymer according to the present disclosure is a polymer manufactured by any polymer manufacturing method described above.

The polymer according to the present disclosure is excellent in wet performance, low loss property, and impact resistance.

A rubber composition according to the present disclosure is a rubber composition including the polymer described above.

The rubber composition according to the present disclosure is excellent in wet performance, low loss property, and impact resistance.

A tire according to the present disclosure is a tire using the rubber composition described above.

The tire according to the present disclosure is excellent in wet performance, low loss property, and impact resistance.

Advantageous Effect

According to the present disclosure, a catalyst composition having high polymerization activity for polymerizing one or more selected from the group consisting of a conjugated diene compound and a compound having an ethylenically unsaturated double bond can be provided, for example. In addition, according to the present disclosure, a polymer manufacturing method capable of polymerizing one or more selected from the group consisting of a conjugated diene compound and a compound having an ethylenically unsaturated double bond can be provided. In addition, according to the present disclosure, a polymer manufactured by the polymer manufacturing method can be provided. In addition, according to the present disclosure, a rubber composition including the polymer can be provided. Further, according to the present disclosure, a tire using the rubber composition can be provided.

DETAILED DESCRIPTION

Hereinafter, embodiments of the present disclosure will be described. These descriptions intend to exemplify the present disclosure and do not limit the present disclosure at all.

In the present disclosure, two or more embodiments can be arbitrarily combined.

Catalyst Composition

A catalyst composition according to the present disclosure is a catalyst composition including a compound represented by Structural Formula I below, wherein the compound has an OH group at at least one of positions 3 to 6 and positions 3' to 6' of the bipyridyl ring; M is a transition metal, a lanthanoid, scandium, or yttrium; $R^1$ and $R^2$ each are a hydrocarbon group having one or more carbon atoms or a halogen atom; and $R^1$ and $R^2$ may be the same or different from each other.

[Formula 2]

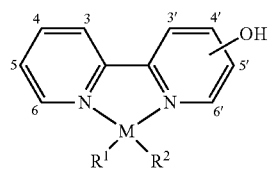

Formula 1

In the compound represented by Structural Formula I, two N atoms on the bipyridyl ring coordinate with M. That is, the bipyridyl ring having at least one OH group is a ligand. Polymerization activity is enhanced by having at least one OH group on the bipyridyl ring. The compounds represented by Structural Formula I may be used singly or in combinations of two or more.

Compound Represented by Structural Formula I

The compound represented by Structural Formula I acts as a catalyst for polymerization reaction. The compound represented by Structural Formula I has an OH group at at least one of positions 3 to 6 and positions 3' to 6' of the bipyridyl ring. The number of OH groups is preferably two from the viewpoint of polymerization activity.

When the compound represented by Structural Formula I has two OH groups, the positions of the OH groups are not particularly limited, and the OH groups may be symmetrically positioned as in Formula I-1 (3,3'-positions), Formula I-2 (4,4'-positions), Formula I-3 (5,5'-positions), and Formula I-4 (6,6'-positions) below or may be asymmetrically positioned as in Formula I-5 (5,6'-positions) and Formula I-6 (4,6'-positions) below, for example.

[Formula 3]

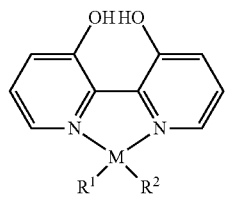
I-1

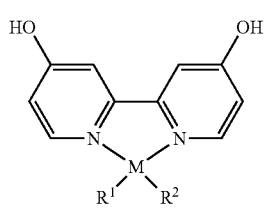
I-2

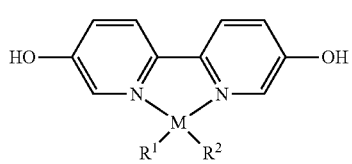
I-3

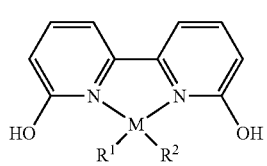
I-4

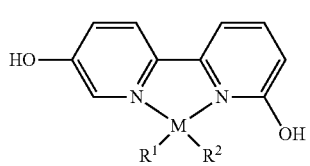
I-5

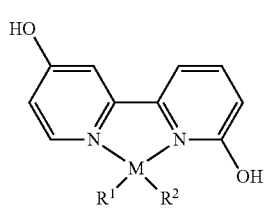
I-6

In one embodiment, the compound represented by the Structural Formula I has one OH group at any position of positions 3 to 6 and has one OH group at any position of positions 3' to 6' of the bipyridyl ring of Structural Formula I.

In Structural Formula I, M is a transition metal, a lanthanoid, scandium, or yttrium. Examples of the transition metal include scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), and cadmium (Cd).

In the catalyst composition according to the present disclosure, M in Structural Formula I is preferably iron (Fe), cobalt (Co), nickel (Ni), palladium (Pd), or copper (Cu). Polymerization activity is further enhanced thereby.

In Structural Formula I, $R^1$ and $R^2$ each are a hydrocarbon group having one or more carbon atoms or a halogen atom, and $R^1$ and $R^2$ may be the same or different from each other.

Examples of the hydrocarbon group for $R^1$ and $R^2$ include hydrocarbon groups having one to four carbon atoms such as a methyl group and an isopropyl group.

Examples of the halogen atom for $R^1$ and $R^2$ include fluorine, chlorine, bromine, and iodine.

In the catalyst composition according to the present disclosure, $R^1$ and $R^2$ in Structural Formula I are each preferably a halogen atom. Polymerization activity is further enhanced thereby.

Examples of the compound represented by Structural Formula I include dihydroxybipyridyl (hereinafter sometimes simply referred to as "DHBP") $CoCl_2$, (DHBP)$PdCl_2$, and (DHBP)$NiBr_2$ below.

[Formula 4]

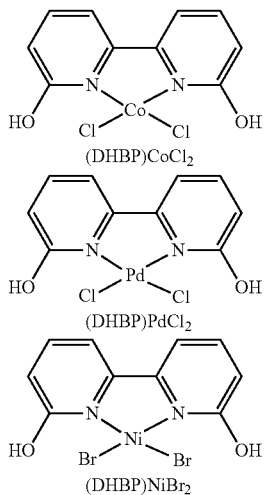

An amount of the compound represented by the Structural Formula I in the catalyst composition according to the present disclosure is not particularly limited as long as it is an effective amount at which a catalytic action may be exerted and can be appropriately adjusted.

A synthesis method of the compound represented by the Structural Formula I is not particularly limited. In the case of (DHBP)$CoCl_2$, (DHBP)$CoCl_2$ can be obtained as a patina-colored solid by reacting DHBP (i.e., 6,6'-dihydroxy-2,2'-bipyridine) with $CoCl_2$ in a solvent such as THF as provided in the following scheme followed by filtering, washing, and drying, for example.

[Formula 5]

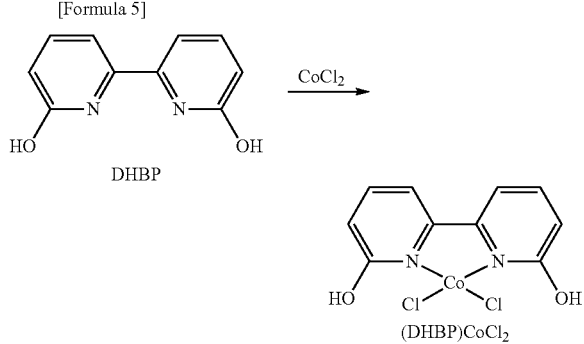

Co-Catalyst

The catalyst composition according to the present disclosure may optionally include a co-catalyst in addition to the compound represented by Structural Formula I described above. Examples of the co-catalyst include a compound of Structural Formula II described later, an aluminoxane, an ionic compound, and a halogen compound. The co-catalysts may be used singly or in combinations of two or more.

It is preferable that the catalyst composition according to the present disclosure further includes a compound of Structural Formula II below.

$$YR_a^3R_b^4R_c^5 \qquad \text{Formula II}$$

wherein Y is a metal selected from Group 1, Group 2, Group 12, and Group 13 in the periodic table, $R^3$ and $R^4$ each are a hydrogen atom or a substituted or unsubstituted hydrocarbon group having 1 to 20 carbon atoms, alkoxy group, or aryloxy group, $R^5$ is a substituted or unsubstituted hydrocarbon group having 1 to 20 carbon atoms, alkoxy group, or aryloxy group, $R^3$, $R^4$, and $R^5$ may be the same or different from one another, and a, b, and c are independently 0 or 1; provided that when Y is a metal selected from the Group 1, a is 1, and b and c are 0; when Y is a metal selected from the Group 2 and Group 12, a and b are 1, and c is 0; and when Y is a metal selected from the Group 13, a, b, and c are 1.

Polymerization activity is further enhanced thereby. The compounds of Structural Formula II may be used singly or in combinations of two or more.

In the compound of Structural Formula II, Y is a metal of Group 13 in one embodiment, and Y is boron or aluminum in another embodiment. In yet another embodiment, Y in the compound of Formula I is a metal of Group 1, and Y is lithium in another embodiment.

Examples of the hydrocarbon group for $R^3$, $R^4$, and $R^5$ in the compound of Structural Formula II include a methyl group, an ethyl group, a tert-butyl group, and a phenyl group.

The hydrocarbon group, alkoxy group, or aryloxy group for $R^3$, $R^4$, and $R^5$ in the compound of Structural Formula II may be substituted by a substituent, and examples of the substituent include a linear or branched alkyl group (for example, methyl group, tert-butyl group) and halogen (for example, fluorine).

Examples of the compound of Structural Formula II include tris(pentafluorophenyl)borane, trimethyl aluminum, triethyl aluminum, triisobutyl aluminum, lithium 2,6-di-tert-butyl-4-methylphenoxide, methylaluminum bis(2,6-di-tert-butyl-4-methylphenoxy), and diisobutyl aluminum hydride. Among them, tris(pentafluorophenyl)borane, trimethyl aluminum, triisobutyl aluminum, lithium 2,6-di-tert-butyl-4-methylphenoxide, and methylaluminum bis(2,6-di-tert-butyl-4-methylphenoxy) are preferable.

When the compound of Structural Formula II is used in the catalyst composition according to the present disclosure, the molar ratio between the compound of Structural Formula II and M of the compound represented by the Structural Formula I (compound of Structural Formula II/M) is 2 or more, 5 or more, 10 or more, or 20 or more and 10,000 or less, 5,000 or less, 1,000 or less, 300 or less, 250 or less, or 100 or less in a preferred embodiment.

It is preferable that the catalyst composition according to the present disclosure further includes an aluminoxane. A polymerization active species is allowed to be efficiently generated thereby. The aluminoxanes may be used singly or in combinations of two or more.

The aluminoxane is a compound obtained by bringing an organic aluminum compound into contact with a condensation agent such as water. Examples of the aluminoxane can include a chain aluminoxane or cyclic aluminoxane having a repeating unit represented by the general formula: (—Al(R')O—) wherein R' is a hydrocarbon group having 1 to 10 carbon atoms, some hydrocarbon groups may be substituted by a halogen atom and/or an alkoxy group, and the degree of polymerization of the repeating unit is 5 or more in one embodiment and is 10 or more in another embodiment, for example.

Examples of R' include a methyl group, an ethyl group, a propyl group, and an isobutyl group. In one embodiment, R' is a methyl group.

In addition, examples of the organic aluminum compound used for a raw material of the aluminoxane include trialkyl aluminums such as trimethyl aluminum, triethyl aluminum, and triisobutyl aluminum and a mixture thereof. In one embodiment, the organic aluminum compound is trimethyl aluminum.

In addition, a commercially available product may be used as the aluminoxane. Examples of such a commercially available product can include MMAO and TMAO manufactured by Tosoh Finechem Corporation.

When the aluminoxane is used in the catalyst composition according to the present disclosure, the molar ratio between Al in the aluminoxane and M of the compound represented by the Structural Formula I (Al/M) is, for example, 1 to 10,000, preferably 10 or more, more preferably 20 or more, still more preferably 50 or more, and especially preferably 80 or more and preferably 5,000 or less, more preferably 1,000 or less, and still more preferably 500 or less.

It is preferable that the catalyst composition according to the present disclosure further includes one or more compounds selected from an ionic compound and a halogen compound. The proportion of impurities contained in a polymer generated can be reduced thereby.

Examples of the ionic compound include N,N-dimethylanilinium tetrakis(pentafluorophenyl)borate and triphenylcarbonium tetrakis(pentafluorophenyl)borate described in Japanese Patent Laid-Open No. 2014-019729. The ionic compounds may be used singly or in combinations of two or more.

When the ionic compound is used in the catalyst composition according to the present disclosure, the molar ratio between the ionic compound and M of the compound represented by the Structural Formula I (ionic compound/M) is 0.1 or more, 0.5 or more, or 1 or more and 10,000 or less, 5,000 or less, 1,000 or less, or 100 or less in a preferred embodiment.

Examples of the halogen compound include organometallic halogen compounds such as ethylaluminum dichloride, ethylmagnesium chloride, butyl magnesium chloride, dimethylaluminum chloride, diethylaluminum chloride, and sesquiethylaluminum chloride. The halogen compounds may be used singly or in combinations of two or more.

When the halogen compound is used in the catalyst composition according to the present disclosure, the molar ratio between the halogen compound and M of the compound represented by the Structural Formula I (halogen compound/M) is 0.1 or more, 0.5 or more, 1 or more, 10 or more, or 20 or more and 10,000 or less, 5,000 or less, 1,000 or less, 500 or less, 300 or less, or 100 or less in a preferred embodiment.

Polymer Manufacturing Method

A polymer manufacturing method according to the present disclosure is a polymer manufacturing method using any catalyst composition described above, the polymer manufacturing method including a step of polymerizing (hereinafter sometimes simply referred to as polymerization step) one or more selected from the group consisting of a conjugated diene compound and a compound having an ethylenically unsaturated double bond in the presence of the catalyst composition.

Conjugated Diene Compound

Examples of the conjugated diene compound include butadiene (1,3-butadiene), isoprene, 1,3-pentadiene, and 2,3-dimethylbutadiene. The conjugated diene compound may be substituted or unsubstituted. In one embodiment, the number of carbon atoms of the conjugated diene compound is 4 to 8. The conjugated diene compounds may be used singly or in combinations of two or more.

In one embodiment, the conjugated diene compound is one or more selected from the group consisting of 1,3-butadiene and isoprene. In another embodiment, the conjugated diene compound is solely 1,3-butadiene.

Compound Having Ethylenically Unsaturated Double Bond

Examples of the compound having an ethylenically unsaturated double bond include a non-conjugated olefin and an aromatic vinyl compound. The compound having an ethylenically unsaturated double bond may be substituted or unsubstituted. The compounds having an ethylenically unsaturated double bond may be used singly or in combinations of two or more.

Examples of the non-conjugated olefin include acyclic non-conjugated olefins such as ethylene, propylene, 1-butene, isobutene, 1-pentene, 1-hexene, 1-heptene, and 1-octene and cyclic non-conjugated olefins such as norbornene, 5-norbornene-2-methanol, and 5-norbornene-2-methyl acetate. In one embodiment, the number of carbon atoms of the non-conjugated olefin is 2 to 10. The non-conjugated olefins may be used singly or in combinations of two or more.

In one embodiment, the non-conjugated olefin is one or more selected from acyclic non-conjugated olefins, that is, linear non-conjugated olefins and branched non-conjugated olefins, and cyclic non-conjugated olefins. In another embodiment, the non-conjugated olefin is an α-olefin. Since α-olefins have a double bond at the α position of the olefin, copolymerization with the conjugated diene compound can be efficiently conducted.

In one embodiment, the non-conjugated olefin is one or more selected from the group consisting of ethylene, propylene, 1-butene, and norbornene. In another embodiment, the non-conjugated olefin is solely ethylene. In another embodiment, the non-conjugated olefin is solely norbornene.

Examples of the aromatic vinyl compound include styrene, an alkylstyrene, and a halogenated alkylstyrene. The aromatic vinyl compounds may be used singly or in combinations of two or more.

The number of carbon atoms in an alkyl group of the alkylstyrene is 1 to 5, for example. Examples of the alkylstyrene include 4-methylstyrene, 3-methylstyrene, and p-tert-butylstyrene.

The number of carbon atoms in an alkyl group of the halogenated alkylstyrene is 1 to 5, for example. Examples of the halogen of the halogenated alkylstyrene include fluorine, chlorine, bromine, and iodine. Examples of the halogenated alkylstyrene include 4-(chloromethyl)styrene and 3-(chloromethyl)styrene.

In one embodiment, the compound having an ethylenically unsaturated double bond is one or more selected from the group consisting of ethylene, norbornene, and 5-norbornene-2-methanol.

It is preferable that in the polymer manufacturing method according to the present disclosure, the conjugated diene compound described above is butadiene and the compound having an ethylenically unsaturated double bond is one or more selected from the group consisting of ethylene and norbornene. Polymerization activity is high even in polymerization of such compounds, and a polymer is easily manufactured.

In one embodiment, the one or more selected from the group consisting of a conjugated diene compound and a compound having an ethylenically unsaturated double bond (hereinafter, they are collectively referred to as monomers) in the polymerization step include solely a conjugated diene compound. In another embodiment, the monomers include a conjugated diene compound and a cyclic olefin. In yet another embodiment, the monomers include a conjugated diene compound and a cyclic olefin containing an OH-group (for example, 5-norbornene-2-methanol).

While the molar ratio between the monomers and M of the compound represented by Structural Formula I described above (monomer/M) in the polymerization step may be appropriately adjusted, the molar ratio is preferably 500 or more, more preferably 1000 or more, and still more preferably 2000 or more from the viewpoint of increasing activity and the molecular weight of a polymer and increasing the degree of polydispersion (Mw/Mn), for example.

A polymerization method is not particularly limited, and coordination polymerization, solution polymerization (anionic polymerization), and the like can be used, for example. In addition, polymerization may be conducted by any conventionally known method such as continuous polymerization, semicontinuous polymerization, and batch polymerization.

In the above-described polymerization step, a polymerization solvent, a polymerization initiator, a terminator, a stabilizer, an extender oil, a modifier, and the like may be used besides the monomers and the catalyst composition without departing from the spirit of the present disclosure. Examples of the polymerization solvent include hydrocarbon-based solvents such as benzene, toluene, cyclohexane, hexane, and butene but are not limited thereto.

A polymerization temperature is not particularly limited and may be appropriately set according to the kind of the monomers, the kind of a catalyst, a desired cys-1,4 content, number-average molecular weight, the degree of polydispersion, Mooney viscosity, and the like. In one embodiment, the polymerization temperature can be set at −100 to 150° C., for example.

The polymerization step may be conducted under an inert gas atmosphere such as nitrogen gas or argon gas.

Other Steps

The polymer manufacturing method according to the present disclosure may optionally include one or more of conventionally known steps, which are conducted in the manufacturing such as a diene-based polymer, including a purification step of a raw material and a solvent; a collection step of a solvent and unreacted monomers; a dehydration step, drying step, and packaging step of a polymer after polymerization; and other steps in addition to the polymerization step described above.

Polymer

A polymer according to the present disclosure is a polymer manufactured by any polymer manufacturing method described above. The polymer according to the present disclosure is excellent in wet performance, low loss property, and impact resistance.

A molecular weight of the polymer is not particularly limited and may be appropriately adjusted. For example, a number-average molecular weight (Mn) of the polymer is 10,000 to 100,000.

In one embodiment, the polymer is one or more selected from the group consisting of a polybutadiene, a synthesized polyisoprene, a styrene-butadiene copolymer, a polyethylene, an ethylene-butadiene copolymer, a butadiene-norbornene copolymer, an isoprene-norbornene copolymer, a butadiene-5-norbornene-2-methanol copolymer, and a butadiene-5-norbornene-2-methyl acetate copolymer.

Rubber Composition

A rubber composition according to the present disclosure is a rubber composition including the polymer described above. The rubber composition according to the present disclosure is excellent in wet performance, low loss property, and impact resistance. The polymers may be used singly or in combinations of two or more.

The rubber composition according to the present disclosure may or may not include a rubber component other than the above-described polymer. Such an additional rubber component may be appropriately selected from known rubber components. Examples of the additional rubber component include natural rubber, synthesized isoprene rubber, butadiene rubber, styrene-butadiene rubber, butyl rubber, a bromide of a copolymer of isobutylene and p-methyl styrene, halogenated butyl rubber, acrylonitrile-butadiene rubber, chloroprene rubber, ethylene-propylene rubber, ethylene propylene diene rubber, styrene-isoprene rubber, styrene-isoprene-butadiene rubber, isoprene-butadiene rubber, chlorosulfonated polyethylene, acrylic rubber, epichlorohydrin rubber, polysulfide rubber, silicone rubber, fluororubber, and urethane rubber. These additional rubber components may be used singly or in combinations of two or more.

Other Components

Known additives blended to a rubber composition may be appropriately blended to the rubber composition according to the present disclosure in addition to the above-described polymer and the additional rubber component which may be optionally included therein. Examples of such additives include a filler, a vulcanizing agent, a crosslinking agent, a vulcanization accelerator, an age resistor, a reinforcing agent, a softener, a vulcanizing co-agent, a colorant, a flame retardant, a lubricant, a foaming agent, a plasticizer, a processing aid, an antioxidant, an anti-scorch agent, an ultraviolet rays protecting agent, an antistatic agent, a color protecting agent, and an oil. These additives may be used singly or in combinations of two or more.

A preparation method of the rubber composition according to the present disclosure is not particularly limited, and a known method can be used. For example, the rubber composition according to the present disclosure is obtained by kneading individual components including the above-described polymer using a kneader such as Banbury mixer, a roll kneader, and an internal mixer. In addition, the rubber composition may be prepared by mixing components other than a vulcanization accelerator and a vulcanizing agent in a non-production (non-pro) phase, and blending a vulcanization accelerator and a vulcanizing agent to the resultant mixture and mixing them in a production (pro) phase.

Rubber Product

While a rubber product obtained by using the rubber composition according to the present disclosure is not particularly limited, examples thereof include a tire, a conveyor belt, anti-vibration rubber, seismic isolation rubber, a rubber crawler, a hose, and a foamed body.

A method for obtaining a rubber product using the rubber composition according to the present disclosure is not particularly limited, and a known method can be used. Conditions for cross-linking or vulcanizing the rubber composition may be appropriately adjusted, and a temperature of 120 to 200° C. and a heating period of 1 minute to 900 minutes may be employed, for example.

Tire

A tire according to the present disclosure is a tire using the rubber composition described above. The tire according to the present disclosure is excellent in wet performance, low loss property, and impact resistance. While an application part in the tire of the rubber composition according to the present disclosure is not particularly limited, examples thereof include tread rubber, base tread rubber, sidewall rubber, side reinforcing rubber, and a bead filler.

A method for manufacturing the tire is not particularly limited, and a known method can be used.

EXAMPLES

Hereinafter, the present disclosure will be described in more detail with examples. However, these examples intend to exemplify the present disclosure and do not limit the present disclosure at all.

The specifics of materials used in the examples are as follows.

6,6'-Dihydroxy-2,2'-bipyridine (DHBP): manufactured by Tokyo Chemical Industry Co., Ltd.

2,2'-Bipyridine (bpy): manufactured by Tokyo Chemical Industry Co., Ltd.

6,6'-Dimethoxy-2,2'-bipyridine (DMBP): synthesized by reference to the report by C. J. Li et al. (J. Am. Chem. Soc. 2016, 138, 5433-5440)

Cobalt chloride ($CoCl_2$): manufactured by Kanto Chemical Co., Inc.

Nickel bromide ($NiBr_2$): manufactured by Tokyo Chemical Industry Co., Ltd.

Diethylaluminum chloride (halogen compound, hereinafter represented by DEAC): manufactured by Tokyo Chemical Industry Co., Ltd.

Triisobutyl aluminum (compound of Structural Formula II, hereinafter represented by TIBA): manufactured by Wako Pure Chemical Industries, Ltd.

Trimethyl aluminum (compound of Structural Formula II, hereinafter represented by $Me_3Al$): manufactured by Sigma-Aldrich Co. LLC.

Diisobutyl aluminum hydride (compound of Structural Formula II, hereinafter represented by DIBAL): manufactured by Tokyo Chemical Industry Co., Ltd.

Polymethyl aluminoxane (aluminoxane, hereinafter represented by TMAO): manufactured by Tosoh Finechem Corporation, TMAO-211

In the examples, DMBP, (DMBP)$CoCl_2$, bpy, (bpy)$CoCl_2$, and (bpy)$NiBr_2$ refer to the following respective structures.

[Formula 6]

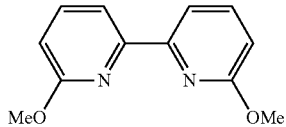

DMBP

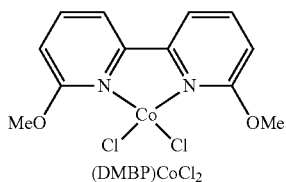

(DMBP)$CoCl_2$

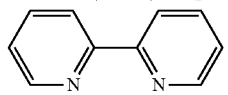

bpy

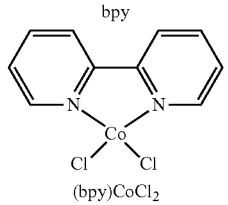

(bpy)$CoCl_2$

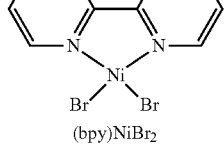

(bpy)$NiBr_2$

In Tables 1 to 7, the designations of abbreviations and the meanings of abbreviated expressions are as follows.
BD: butadiene
ET: ethylene
MeOH: methanol
NB: norbornene
IP: isoprene
NBM: 5-norbornene-2-methanol
NBMA: 5-norbornene-2-methyl acetate
$(C_6F_5)_3B$: tris(pentafluorophenyl)borane
$Ph_3C^+(C_6F_5)_4B^-$: triphenylcarbonium tetrakis(pentafluorophenyl)borate
1,4-cis: contained amount of 1,4-cis bonding
1,4-trans: contained amount of 1,4-trans bonding
1,2: contained amount of 1,2-vinyl bonding In the examples, the activity (g/mmol (M) hour) refers to a mass (g) of a polymer obtained per mmol of the compound represented by Structural Formula I or of a comparative compound per unit time. In addition, the activity (g/mmol (M) hour atm) refers to a mass (g) of a polymer obtained per mmol of the compound represented by Structural Formula I or of a comparative compound per atm of ethylene and per unit time.

In the examples, the microstructure of a polymer was obtained from an integration ratio between a $^1$H-NMR spectrum (contained amount of 1,2-vinyl bonding) and a $^{13}$C-NMR spectrum (contained amount ratio between 1,4-cis bonding and 1,4-trans bonding) or the like.

In the examples, the number-average molecular weight Mn and the degree of polydispersion (Mw/Mn) of a polymer were obtained by using gel permeation chromatography [GPC: HLC-8220GPC/HT manufactured by Tosoh Corporation, column: GMH$_{HR}$-H(S)HT manufactured by Tosoh Corporation ×2, detector: differential refractometer (RI)] at a measurement temperature of 40° C. with THF used as an elute based on monodisperse polystyrene.

In the tables of the examples, the yielded amounts and the yields are based on methanol insoluble parts unless otherwise stated. The expression N.D. refers to "not determined."

In Table 5, the conversion ratios of butadiene and norbornene were each calculated from integration ratios of peaks obtained by $^1$-NMR [$^1$H-NMR: δ5.1-5.2 (=CH$_2$ in vinyl unit of butadiene monomer), 6.0 (—CH= in vinyl unit of norbornene monomer), and 6.4 (—CH= in vinyl unit of butadiene monomer)]. The monomer unit ratios of obtained copolymers were each calculated from integration ratios of peaks obtained by $^1$H-NMR [$^1$H-NMR: δ1.0-2.8 (—CH$_2$— and —CH— in norbornene unit and —CH$_2$— in 1,4-unit of butadiene), 5.3-5.5 (—CH= in 1,4-unit of butadiene), and 5.5-5.7 (—CH= in 1,2-vinyl unit)]. The conversion ratios of isoprene and norbornene were each calculated from integration ratios of peaks obtained by $^1$H-NMR [$^1$H-NMR: δ6.0 (—CH= in vinyl unit of norbornene monomer), and 6.5 (—CH= in vinyl unit of isoprene monomer)]. The monomer unit ratios of obtained copolymers were each calculated from integration ratios of peaks obtained by $^1$H-NMR [$^1$H-NMR: δ1.0-2.8 (—CH$_2$— and —CH— in norbornene unit), 4.5-4.9 (=CH$_2$ in vinyl unit of isoprene), 4.9-5.3 (—CH= in 1,4-unit of isoprene), and 5.6-5.7 (—CH= in 1,2-vinyl unit of isoprene)].

In Table 6, the conversion ratios of butadiene and 5-norbornene-2-methanol were each calculated from integration ratios of peaks obtained by $^1$H-NMR [$^1$H-NMR: 5.1-5.2 (=CH$_2$ in vinyl unit of butadiene monomer), 6.0-6.2 (—CH= in vinyl unit of 5-norbornene-2-methanol monomer), and 6.4 (—CH= in vinyl unit of butadiene monomer)]. The monomer unit ratios of obtained copolymers were each calculated from integration ratios of peaks obtained by $^1$H-NMR [$^1$H-NMR: δ3.3-3.7 (—CH$_2$—O in 5-norbornene-2-methanol unit), 5.3-5.5 (—CH= in 1,4-unit of butadiene), and 5.5-5.7 (—CH= in 1,2-vinyl unit)].

In Table 7, the monomer unit ratios of obtained copolymers were each calculated from integration ratios of peaks obtained by $^1$H-NMR [$^1$H-NMR: δ3.6-3.8 (—O—CH$_3$ in 5-norbornene-2-methyl acetate unit), 5.3-5.5 (—CH= in 1,4-unit of butadiene), and 5.5-5.7 (—CH= in 1,2-vinyl unit)].

Synthesis Example 1

Synthesis of (DHBP)CoCl$_2$ (Compound Represented by Structural Formula I)

DHBP and CoCl$_2$ were reacted in THF under room temperature for 24 hours to obtain a patina-colored solid of targeted (DHBP)CoCl$_2$ with a yield of 98%. Structure analysis was performed by IR measurement and element analysis to confirm that the obtained compound was (DHBP)CoCl$_2$.

Synthesis Example 2

Synthesis of (bpy)CoCl$_2$ (Comparative Compound)

Reaction was conducted in the same manner as Synthesis Example 1 except that DHBP was changed to bpy in Synthesis Example 1 to obtain (bpy)CoCl$_2$.

Synthesis Example 3

Synthesis of (DMBP)CoCl$_2$ (Comparative Compound)

Reaction was conducted in the same manner as Synthesis Example 1 except that DHBP was changed to DMBP in Synthesis Example 1 to obtain (DMBP)CoCl$_2$.

Synthesis Example 4

Synthesis of (DHBP)NiBr$_2$ (Compound Represented By Structural Formula I)

Reaction was conducted in the same manner as Synthesis Example 1 except that CoCl$_2$ was changed to NiBr$_2$ in Synthesis Example 1 to obtain (DHBP)NiBr$_2$.

Synthesis Example 5

Synthesis of (bpy)NiBr$_2$ (Comparative Compound)

Reaction was conducted in the same manner as Synthesis Example 1 except that DHBP was changed to bpy and CoCl$_2$ was changed to NiBr$_2$ in Synthesis Example 1 to obtain (bpy)NiBr$_2$.

Example 1

Manufacturing of Polymer (Homopolymerization of Butadiene)

In a glovebox under an argon atmosphere, 30 mL of a toluene solution containing butadiene was poured to a pressure-resistant glass reactor, and 0.02 mmol of (DHBP)CoCl$_2$ obtained in Synthesis Example 1 and DEAC co-catalyst were then added thereto while stirring the solution so that the molar ratio satisfied butadiene/(DHBP)CoCl$_2$/DEAC=5,000/1/100. Then, polymerization was conducted at a temperature of 30° C. for 1 hour. After the polymerization, ethanol was added to terminate the reaction. Then, the solution was poured into a liquid mixture containing 300 mL of methanol, 15 mL of concentrated hydrochloric acid, and 100 mg of butylhydroxytoluene (BHT). The precipitated polymer was separated by decantation followed by vacuum drying at 60° C. for 6 hours to obtain a polymer. The yielded amount (mg) from the polymerization reaction, yield (%), activity, and microstructure, Mn, and Mw/Mn of the obtained polymer are collectively presented in Table 1.

TABLE 1

Polymerization of BD

| | Compound of Structural Formula I | Ligand | Co-catalyst | Amount of BD (mg) | Yielded amount (mg) | Yield (%) | Activity (g/mmol (M) hour) | Polymer Microstructure (%) 1,4-cis | 1,4-trans | 1,2 | Mn | Mw/Mn |
|---|---|---|---|---|---|---|---|---|---|---|---|---|
| Example 1 | (DHBP)CoCl$_2$ | DHBP | DEAC | 5660 | 6056 | >99 | 303 | 82.25 | 8.29 | 9.46 | 34,500 | 8.46 |
| Comparative Example 1 | (bpy)CoCl$_2$ | bpy | DEAC | 5750 | 2590 | 45 | 130 | 75.51 | 4.45 | 20.04 | 10,000 | 3.4 |
| Comparative Example 2 | (DMBP)CoCl$_2$ | DMBP | DEAC | 5300 | 410 | 7.7 | 21 | 67.84 | 6.53 | 25.63 | 6,300 | 1.58 |
| Example 2 | (DHBP)CoCl$_2$ | DHBP | (C$_6$F$_5$)$_3$B TIBA | 5490 | 360 | 6.6 | 18 | 68.57 | 0.13 | 31.3 | 29,700 | 9.81 |
| Example 3 | (DHBP)CoCl$_2$ | DHBP | Ph$_3$C$^+$(C$_6$F$_5$)$_4$B$^-$ TIBA | 5490 | 4850 | 88 | 243 | 96.97 | 1.52 | 1.51 | 96,100 | 4.2 |
| Example 4 | (DHBP)CoCl$_2$ | DHBP | Ph$_3$C$^+$(C$_6$F$_5$)$_4$B$^-$ TIBA | 5390 | 1570 | 29 | 157 | 94.2 | 2 | 3.8 | 18,000 | 1.87 |
| Example 5 | (DHBP)CoCl$_2$ | DHBP | Ph$_3$C$^+$(C$_6$F$_5$)$_4$B$^-$ Me$_3$Al | 5770 | 2700 | 47 | 270 | 93.55 | 2.66 | 3.79 | 13,500 | 1.95 |
| Example 6 | (DHBP)CoCl$_2$ | DHBP | Ph$_3$C$^+$(C$_6$F$_5$)$_4$B$^-$ DEAC | 5430 | 4030 | 74 | 403 | 91.64 | 3.16 | 5.21 | 93,800 | 4.71 |
| Example 7 | (DHBP)CoCl$_2$ | DHBP | Ph$_3$C$^+$(C$_6$F$_5$)$_4$B$^-$ DIBAL | 5390 | 310 | 6 | 31 | 94.87 | 3.06 | 2.07 | 11,200 | 2.11 |
| Example 8 | (DHBP)NiBr$_2$ | DHBP | Ph$_3$C$^+$(C$_6$F$_5$)$_4$B$^-$ Me$_3$Al | 5480 | 4230 | 77 | 423 | 91.58 | 3.16 | 5.26 | 42,800 | 3.01 |
| Example 9 | (DHBP)NiBr$_2$ | DHBP | (C$_6$F$_5$)$_3$B Me$_3$Al | 5760 | 570 | 10 | 28.5 | 91.54 | 2.57 | 5.89 | 40,500 | 1.87 |

Comparative Examples 1-2, Examples 2-3, Examples 4-7, and Examples 8-9

Polymers were obtained by conducting polymerization in the same manner as Example 1 except that conditions were changed as provided in Table 1 and Table 2 in Example 1.

TABLE 2

Molar ratios of components in Examples and Comparative Examples

| | Molar ratio |
|---|---|
| Example 1 | BD/(DHBP)CoCl$_2$/DEAC = 5,000/1/100 |
| Comparative Example 1 | BD/(bpy)CoCl$_2$/DEAC = 5,000/1/100 |
| Comparative Example 2 | BD/(DMBP)CoCl$_2$/DEAC = 5,000/1/100 |
| Example 2 | BD/(DHBP)CoCl$_2$/TIBA/(C$_6$F$_5$)$_3$B = 5,000/1/20/2 |
| Example 3 | BD/(DHBP)CoCl$_2$/TIBA/Ph$_3$C$^+$(C$_6$F$_5$)$_4$B$^-$ = 5,000/1/20/2 |
| Example 4 | BD/(DHBP)CoCl$_2$/TIBA/Ph$_3$C$^+$(C$_6$F$_5$)$_4$B$^-$ = 5,000/1/20/1 |
| Example 5 | BD/(DHBP)CoCl$_2$/Me$_3$Al/Ph$_3$C$^+$(C$_6$F$_5$)$_4$B$^-$ = 5,000/1/20/1 |
| Example 6 | BD/(DHBP)CoCl$_2$/DEAC/Ph$_3$C$^+$(C$_6$F$_5$)$_4$B$^-$ = 5,000/1/20/1 |
| Example 7 | BD/(DHBP)CoCl$_2$/DIBAL/Ph$_3$C$^+$(C$_6$F$_5$)$_4$B$^-$ = 5,000/1/20/1 |
| Example 8 | BD/(DHBP)NiBr$_2$/Me$_3$Al/Ph$_3$C$^+$(C$_6$F$_5$)$_4$B$^-$ = 5,000/1/20/1 |
| Example 9 | BD/(DHBP)NiBr$_2$/Me$_3$Al/(C$_6$F$_5$)$_3$B = 5,000/1/20/1 |
| Example 10 | (DHBP)CoCl$_2$/TMAO = 1/100 |
| Comparative Example 4 | (bpy)CoCl$_2$/TMAO = 1/100 |
| Comparative Example 5 | (DMBP)CoCl$_2$/TMAO = 1/100 |
| Comparative Example 6 | (bpy)NiBr$_2$/TMAO = 1/100 |
| Example 11 | (DHBP)CoCl$_2$/TMAO = 1/100 |
| Example 12 | BD/(DHBP)CoCl$_2$/TMAO = 2,500/1/100 |
| Example 13 | BD/(DHBP)CoCl$_2$/TMAO = 2,500/1/100 |
| Example 14 | BD/(DHBP)CoCl$_2$/TMAO = 2,500/1/100 |
| Example 15 | BD/(DHBP)NiBr$_2$/TMAO = 2,500/1/100 |
| Example 16 | BD/(DHBP)NiBr$_2$/TMAO = 2,500/1/100 |
| Example 17 | BD/NB/(DHBP)CoCl$_2$/TMAO = 250/250/1/100 |
| Example 18 | BD/NB/(DHBP)CoCl$_2$/DEAC = 250/250/1/100 |
| Example 19 | BD/NB/(DHBP)CoCl$_2$/Me$_3$Al/Ph$_3$C$^+$(C$_6$F$_5$)$_4$B$^-$ = 250/250/1/20/20 |
| Example 20 | BD/NB/(DHBP)NiBr$_2$/TMAO = 250/250/1/100 |
| Example 21 | IP/NB/(DHBP)NiBr$_2$/TMAO = 250/250/1/100 |
| Example 22 | BD/NBM/(DHBP)NiBr$_2$/TMAO/TIBA = 250/250/1/100/250 |
| Comparative Example 3 | BD/NBM/(bpy)NiBr$_2$/TMAO/TIBA = 250/250/1/100/250 |
| Example 23 | BD/NBMA/(DHBP)NiBr$_2$/TMAO = 250/250/1/100 |

Example 10

Manufacturing of Polymer (Homopolymerization of Ethylene)

Ethylene was reacted at 30° C. in 30 mL of toluene in the presence of 0.02 mmol of (DHBP)CoCl$_2$ obtained in Synthesis Example 1 and TMAO as a co-catalyst. At that time, the molar ratio was set at (DHBP)CoCl$_2$/TMAO=1/100. After the completion of the reaction, the reaction mixture system was dropped into 5% hydrochloric acid-methanol solution, and the precipitate or oil was collected by decantation. After the filtrate was neutralized with an ammonia aqueous solution, and the solvent was distilled away under reduced pressure, extraction was conducted with dichloromethane/water followed by concentration using an evaporator to collect an oily compound. The yielded amount (mg) from the polymerization reaction, activity, and Mn and Mw/Mn of the obtained polymer are collectively presented in Table 3.

TABLE 3

Polymerization of ET

| | Compound of Structural Formula I | Ligand | Co-catalyst | ET charging pressure (atm) | Yielded amount MeOH soluble part | Form | Time (hours) | Activity (g/mmol (M) hour atm) | Polymer Mn | Mw/Mn |
|---|---|---|---|---|---|---|---|---|---|---|
| Example 10 | (DHBP)CoCl$_2$ | DHBP | TMAO | 1 | 790 | Oil | 19 | 2.09 | 470 | 1.05 |
| Comparative Example 4 | (bpy)CoCl$_2$ | bpy | TMAO | 1 | 96 | Oil | 19 | 0.25 | N.D. | N.D. |
| Comparative Example 5 | (DMBP)CoCl$_2$ | DMBP | TMAO | 1 | 20 | Oil | 19 | 0.05 | N.D. | N.D. |
| Comparative Example 6 | (bpy)NiBr$_2$ | bpy | TMAO | 1 | trace | — | 4 | — | — | — |
| Example 11 | (DHBP)CoCl$_2$ | DHBP | TMAO | 10 | 280 | Oil | 19 | 0.08 | 540 | 1.08 |

Comparative Examples 4-6

Polymers were obtained by conducting polymerization in the same manner as Example 1 except that conditions were changed as provided in Table 3 in Example 10.

Example 11

A polymer was obtained by conducting polymerization in the same manner as Example 10 except that the pressure of ethylene was changed to 10 atm in Example 10.

Example 12

Manufacturing of Copolymer (Copolymerization of Butadiene and Ethylene)

Butadiene and ethylene (charging pressure of 1 atm) were reacted at 30° C. in 30 mL of toluene for 19 hours in the presence of 0.02 mmol of (DHBP)CoCl$_2$ and TMAO as a co-catalyst. At that time, the molar ratio was set at butadiene/(DHBP)CoCl$_2$/TMAO=2,500/1/100. After the completion of the reaction, the reaction mixture system was dropped into 5% hydrochloric acid-methanol solution, and the precipitate or oil was collected by decantation. After the filtrate was neutralized by an ammonia aqueous solution, and the solvent was distilled away under reduced pressure, extraction was conducted with dichloromethane/water followed by concentration using an evaporator to collect an oily compound. The yielded amount (mg) from the polymerization reaction, activity, and microstructure, Mn, and Mw/Mn of the obtained copolymer are collectively presented in Table 4.

TABLE 4

Copolymerization of BD and ET

| | Amount of BD (mg) | ET charging pressure (atm) | Compound of Structural Formula I | Ligand | Co-catalyst | Yielded amount MeOH insoluble part | Yielded amount MeOH soluble part | Total | Activity (g/mmol (M) hour atm) | Microstructure (%) 1,4-cis | 1,4-trans | 1,2 | Mn | Mw/Mn |
|---|---|---|---|---|---|---|---|---|---|---|---|---|---|---|
| Example 12 | 2650 | 1 | (DHBP)CoCl$_2$ | DHBP | TMAO | 2180 | — | 2180 | 5.74 | 87.3 | 6.1 | 6.6 | 32,000 | 2.3 |
| Example 13 | 2670 | 5 | (DHBP)CoCl$_2$ | DHBP | TMAO | 1700 | 100 | 1800 | 0.95 | 84.7 | 8.5 | 6.8 | 7,700 | 2.01 |
| Example 14 | 2680 | 10 | (DHBP)CoCl$_2$ | DHBP | TMAO | 1470 | 40 | 1510 | 0.4 | 81.8 | 10.7 | 7.5 | 5,100 | 1.74 |

TABLE 4-continued

Copolymerization of BD and ET

| | Amount of BD (mg) | ET charging pressure (atm) | Compound of Structural Formula I | Ligand | Co-catalyst | Yielded amount | | | Activity (g/mmol (M) hour | Polymer | | | | |
|---|---|---|---|---|---|---|---|---|---|---|---|---|---|---|
| | | | | | | MeOH insoluble part | MeOH soluble part | Total | atm) | Microstructure (%) | | | | Mw/Mn |
| | | | | | | | | | | 1,4-cis | 1,4-trans | 1,2 | Mn | |
| Example 15 | 2750 | 1 | (DHBP)NiBr$_2$ | DHBP | TMAO | 1410 | 210 | 1620 | 3.71 | 81.8 | 10.8 | 7.4 | 4,500 | 1.85 |
| Example 16 | 2650 | 10 | (DHBP)NiBr$_2$ | DHBP | TMAO | 320 | 550 | 870 | 0.23 | 58.7 | 25.1 | 16.2 | 1,200 | 1.22 |

Examples 13-14 and Examples 15-16

Copolymers were obtained by conducting polymerization in the same manner as Example 12 except that conditions were changed as provided in Table 4 and Table 2 in Example 12.

Example 17

Manufacturing of Copolymer (Copolymerization of Butadiene and Norbornene)

Butadiene and norbornene were reacted at 30° C. in 5 mL of toluene for 4 hours in the presence of 0.02 mmol of (DHBP)CoCl$_2$ and TMAO as a co-catalyst. At that time, the molar ratio was set at butadiene/norbornene/(DHBP)CoCl$_2$/TMAO=250/250/1/100. After the completion of the reaction, the reaction mixture system was dropped into 5% hydrochloric acid-methanol solution, and the precipitate was collected by suction filtration. The yielded amount (mg) from the polymerization reaction, activity, monomer ratio, monomer conversion ratio, and ratio between butadiene units and norbornene units, Mn, Mw/Mn, and form of the obtained copolymer are collectively presented in Table 5.

Examples 18-20

Copolymers were obtained by conducting polymerization in the same manner as Example 17 except that conditions were changed as provided in Table 5 and Table 2 in Example 17.

Example 21 (Copolymerization Of Isoprene And Norbornene)

A copolymer was obtained by conducting polymerization in the same manner as Example 20 except that conditions were changed as provided in Table 5 and Table 2 in Example 20.

Example 22

Manufacturing of Copolymer (Copolymerization of Butadiene and 5-Norbornene-2-Methanol)

Butadiene and 5-norbornene-2-methanol were reacted at 30° C. in 10 mL of toluene for 4 hours in the presence of 0.02 mmol of (DHBP)NiBr$_2$ and TMAO and TIBA as co-catalysts. At that time, the molar ratio was set at butadiene/5-norbornene-2-methanol/(DHBP)NiBr$_2$/TMAO/TIBA=250/

TABLE 5

Copolymerization of BD or IP and NB

| | Amount of BD (mg) | Amount of NB (mg) | Compound of Structural Formula I | Ligand | Co-catalyst | Yielded amount (mg) | Activity (g/mmol (M) hour) | Monomer ratio BD/NB (%) | Monomer conversion ratio BD-NB (%) | BD unit/NB unit ratio in co-polymer (%) | Mn | Mw/Mn | Form |
|---|---|---|---|---|---|---|---|---|---|---|---|---|---|
| Example 17 | 250 | 469 | (DHBP)CoCl$_2$ | DHBP | TMAO | 90 | 1.1 | 48/52 | N.D. | 91/9 | 7,900 | 1.6 | Oil |
| Example 18 | 240 | 471 | (DHBP)CoCl$_2$ | DHBP | DEAC | 50 | 0.6 | 47/53 | 43-13 | 87/13 | N.D. | N.D. | Oil |
| Example 19 | 270 | 470 | (DHBP)CoCl$_2$ | DHBP | Me$_3$Al Ph$_3$C$^+$(C$_6$F$_5$)$_4$B$^-$ | 30 | 0.4 | 50/50 | 41-11 | 91/9 | N.D. | N.D. | Oil |
| Example 20 | 310 | 469 | (DHBP)NiBr$_2$ | DHBP | TMAO | 420 | 5.3 | 53/47 | N.D. | 43/57 | 3,340 | 1.7 | Powder |

| | Amount of IP (mg)[mL] | Amount of NB (mg) | Compound of Structural Formula I | Ligand | Co-catalyst | Yielded amount (mg) | | Activity (g/mmol (M) hour) | Monomer ratio IP/NB (%) | Monomer conversion ratio IP-NB (%) | IP unit/NB unit ratio in co-polymer (%) | Mn | Mw/Mn | Form |
|---|---|---|---|---|---|---|---|---|---|---|---|---|---|---|
| | | | | | | MeOH insoluble part | MeOH soluble part | | | | | | | |
| Example 21 | 341[0.5] | 467 | (DHBP)NiBr$_2$ | DHBP | TMAO | 120 | 80 | 2.5 | 50/50 | 9-54 | 11/89 | 3,370 | 1.51 | Powder |

250/1/100/250. After the completion of the reaction, the reaction mixture system was dropped into 5% hydrochloric acid-methanol solution, and the oily precipitate was collected by suction filtration. The yielded amount (mg) from the polymerization reaction, activity, monomer ratio, monomer conversion ratio, and ratio between butadiene units and 5-norbornene-2-methanol units, Mn, and Mw/Mn of the obtained copolymer are collectively presented in Table 6.

diene and ethylene, copolymerization of butadiene or isoprene and norbornene, copolymerization of butadiene and 5-norbornene-2-methanol, and copolymerization of butadiene and 5-norbornene-2-methyl acetate could be more actively conducted than the case of a catalyst whose ligand was bpy. In addition, a polybutadiene, polyethylene, butadiene-ethylene copolymer, butadiene-norbornene copolymer, isoprene-norbornene copolymer, butadiene-5-nor-

TABLE 6

Copolymerization of BD and NBM

| | Amount of BD (mg) | Amount of NBM (mg) | Compound of Structural Formula I | Ligand | Co-catalyst | Yielded amount (mg) | Activity (g/mmol (M) hour) | Monomer ratio BD/NBM (%) | Monomer conversion ratio BD-NBM (%) | BD unit/NBM unit ratio in copolymer (%) | Mn | Mw/Mn |
|---|---|---|---|---|---|---|---|---|---|---|---|---|
| Example 22 | 340 | 621 | (DHBP)NiBr$_2$ | DHBP | TMAO TIBA | 150 | 1.9 | 56/44 | 65-3 | 99/1 | 6,440 | 1.83 |
| Comparative Example 3 | 340 | 621 | (bpy)NiBr$_2$ | bpy | TMAO TIBA | trace | — | 56/44 | 2-11 | —/— | — | — |

Comparative Example 3

Polymerization was conducted in the same manner as Example 22 except that (DHBP)NiBr$_2$ was changed to (bpy)NiBr$_2$ obtained in Synthesis Example 5 in Example 22 as provided in Table 6 and Table 2. However, reaction hardly proceeded.

Example 23

Manufacturing Of Copolymer (Copolymerization Of Butadiene And 5-Norbornene-2-Methyl Acetate)

Butadiene and 5-norbornene-2-methyl acetate were reacted at 80° C. in 5 mL of toluene for 18 hours in the presence of 0.02 mmol of (DHBP)NiBr$_2$ and TMAO as a co-catalyst. At that time, the molar ratio was set at butadiene/norbornene/(DHBP)CoCl$_2$/TMAO=250/250/1/100. The reaction mixture system was dropped into 5% hydrochloric acid-methanol solution, the solution was neutralized with an ammonia aqueous solution, and the solvent was distilled away under reduced pressure. Thereafter, extraction was conducted with ethyl acetate/water followed by concentration using an evaporator to collect an oily compound. The yielded amount (mg) from the polymerization reaction, monomer ratio, and ratio between butadiene units and 5-norbornene-2-methyl acetate units of the obtained copolymer are collectively presented in Table 7.

bornene-2-methanol copolymer, and butadiene-5-norbornene-2-methyl acetate copolymer could be obtained through these polymerizations.

With respect to Table 1, as seen from the comparison between Example 1 and Comparative Examples 1-2, it has been found that activity is high when the catalyst compositions of the present disclosure including the compound represented by Structural Formula I are used even when the same co-catalyst (DEAC) is used. In addition, it has been confirmed that polymerization reaction proceeds without any problem even in the cases of changing the co-catalyst from that of Example 1 (Examples 2-9).

As seen from Table 3, it has been found that activity is high when the catalyst compositions of the present disclosure including the compound represented by Structural Formula I are used even in the case of polymerizing ethylene (Examples 10-11 and Comparative Examples 4-6).

As seen from Table 4, it has been confirmed that in the case of using the catalyst compositions of the present disclosure including the compound represented by Structural Formula I, copolymerization reaction between ethylene and butadiene proceeds without any problem even when the pressure of ethylene is changed (Examples 12 to 16).

As seen from Table 5, it has been confirmed that copolymerization reaction between butadiene and norbornene proceeds without any problem even in the case of changing the co-catalyst (Examples 17-19) and in the case of changing

TABLE 7

Copolymerization of BD and NBMA

| | Amount of BD (mg) | Amount of NBMA (mg) | Compound of Structural Formula I | Ligand | Co-catalyst | Yielded amount (mg) | Monomer ratio BD/NBMA (%) | BD unit/NBMA unit ratio in copolymer (%) |
|---|---|---|---|---|---|---|---|---|
| Example 23 | 300 | 0.7 | (DHBP)NiBr$_2$ | DHBP | TMAO | 87 | 52/48 | 58/42 |

As presented in Table 1 and Tables 3 to 7, by using catalyst compositions including the compound represented by Structural Formula I, homopolymerization of butadiene, homopolymerization of ethylene, copolymerization of butathe transition metal M (Examples 17 and 20). In addition, as seen from Example 21, it has been confirmed that copolymerization reaction between isoprene and norbornene proceeds without any problem when the catalyst composition of the present disclosure including the compound represented by Structural Formula I is used.

With respect to Table 6, as seen from the comparison between Example 22 and Comparative Example 3, it has been found that activity in the copolymerization of butadiene and 5-norbornene-2-methanol is high when the catalyst composition of the present disclosure including the compound represented by Structural Formula I is used even in the case of using the same co-catalysts (TMAO and TIBA).

In addition, as seen from Example 23 in Table 7, it has been confirmed that in the copolymerization of butadiene and 5-norbornene-2-methyl acetate, copolymerization reaction proceeds without any problem by using the catalyst composition of the present disclosure including the compound represented by Structural Formula I.

INDUSTRIAL APPLICABILITY

According to the present disclosure, a catalyst composition having high polymerization activity for polymerizing one or more selected from the group consisting of a conjugated diene compound and a compound having an ethylenically unsaturated double bond can be provided, for example. In addition, according to the present disclosure, a polymer manufacturing method capable of polymerizing one or more selected from the group consisting of a conjugated diene compound and a compound having an ethylenically unsaturated double bond can be provided. In addition, according to the present disclosure, a polymer manufactured by the polymer manufacturing method can be provided. In addition, according to the present disclosure, a rubber composition including the polymer can be provided. Further, according to the present disclosure, a tire using the rubber composition can be provided.

The invention claimed is:

1. A catalyst composition, comprising a compound represented by Structural Formula I:

[Formula 1]

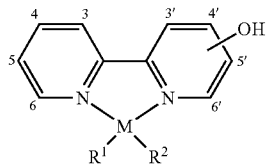

Formula 1 wherein the compound has an OH group at at least one of positions 3 to 6 and positions 3' to 6' of the bipyridyl ring; M is a transition metal, a lanthanoid, scandium, or yttrium; $R^1$ and $R^2$ each are a hydrocarbon group having one or more carbon atoms or a halogen atom; and $R^1$ and $R^2$ may be the same or different from each other; and a compound of Structural Formula II:

$YR^3_a R^4_b R^5_c$ Formula II wherein Y is a metal selected from Group 1, Group 2, Group 12, and Group 13 in the periodic table, $R^3$ and $R^4$ each are a hydrogen atom or a substituted or unsubstituted hydrocarbon group having 1 to 20 carbon atoms, alkoxy group, or aryloxy group, $R^5$ is a substituted or unsubstituted hydrocarbon group having 1 to 20 carbon atoms, alkoxy group, or aryloxy group, $R^3$, $R^4$, and $R^5$ may be the same or different from one another, and a, b, and c are independently 0 or 1; provided that when Y is a metal selected from the Group 1, a is 1, and b and c are 0; when Y is a metal selected from the Group 2 and Group 12, a and b are 1, and c is 0; and when Y is a metal selected from the Group 13, a, b, and c are 1.

2. The catalyst composition according to claim 1, further comprising an aluminoxane.

3. The catalyst composition according to claim 2, further comprising one or more compounds selected from an ionic compound and a halogen compound.

4. The catalyst composition according to claim 2, wherein M in Structural Formula I is iron (Fe), cobalt (Co), nickel (Ni), palladium (Pd), or copper (Cu).

5. The catalyst composition according to claim 1, further comprising one or more compounds selected from an ionic compound and a halogen compound.

6. The catalyst composition according to claim 1, wherein M in Structural Formula I is iron (Fe), cobalt (Co), nickel (Ni), palladium (Pd), or copper (Cu).

7. The catalyst composition according to claim 1, wherein $R^1$ and $R^2$ in Structural Formula I are each a halogen atom.

8. The catalyst composition according to claim 1, wherein the compound represented by Structural Formula I has one OH group at any position of positions 3 to 6 and has one OH group at any position of positions 3' to 6' of the bipyridyl ring of Structural Formula I.

9. A polymer manufacturing method using the catalyst composition according to claim 1, comprising:
a step of polymerizing one or more selected from the group consisting of a conjugated diene compound and a compound having an ethylenically unsaturated double bond in the presence of the catalyst composition.

10. The polymer manufacturing method according to claim 9, wherein the conjugated diene compound is butadiene, and the compound having an ethylenically unsaturated double bond is one or more selected from the group consisting of ethylene and norbornene.

* * * * *